Dec. 2, 1924.

O. L. BARNEBEY 1,517,526

RAPID REACTION FURNACE

Filed March 14, 1921      2 Sheets-Sheet 1

Oscar L. Barnebey, Inventor
By Chas. Silver
Patents Section, C.W.S.
For William C. Williams
Assistant Secretary of War Dec. 2, 1924.

O. L. BARNEBEY

RAPID REACTION FURNACE

Filed March 14, 1921

Patented Dec. 2, 1924.

1,517,526

UNITED STATES PATENT OFFICE.

OSCAR L. BARNEBEY, OF DETROIT, MICHIGAN.

RAPID-REACTION FURNACE.

Application filed March 14, 1921. Serial No. 452,279.

*To all whom it may concern:*

Be it known that I, OSCAR L. BARNEBEY, a citizen of the United States, residing in Detroit, in the county of Wayne, State of Michigan, have invented certain new and useful Improvements in a Rapid-Reaction Furnace, of which the following is a specification.

The present invention relates to furnaces, or apparatus wherein reactions between solids and gases or vapors are caused to take place for the purpose of modifying the solid or the gas or both or for causing catalytic reactions.

Heretofore in the treatment of solids with gaseous fluids this has usually been accomplished by placing the solid in some form of container and passing the fluid in contact therewith, either over or through the granular or otherwise suitably divided solid. It is also a more or less common method to suspend the solid in a liquid medium and bubble the gas therethrough.

For a great many purposes these modes of operation are open to objection. For instance, where a liquid medium is used it is obvious that only fairly low temperatures are feasible. Further, sometimes it is necessary or desirable that the reaction take place very quickly or that the reaction products be removed immediately from the vicinity of the reaction. In the latter cases when the solid material is contained in trays, cylinders, etc., it will be readily seen that an appreciable time is necessary for the gas to penetrate the mass of material and for the reaction products to get out and that these two interfere with each other.

It is among the objects of the present invention, therefore, to produce an apparatus and method wherein the solid material, be it one of the re-agents or a catalyst, is very quickly brought into contact with the gaseous fluid and the reaction products removed before injurious effects can be produced.

Another object is an apparatus and method of operation wherein the solid is contacted with the gas in such fashion that the gas immediately envelopes each individual particle of the solid and may be kept in contact therewith for as long a time as may be necessary to cause the desired reaction, the length of time being under control of the operator.

A still further object is to obtain apparatus of large capacity for a minimum cost of construction materials.

Other objects will readily appear to those skilled in the art upon consideration of the following description which will be more easily understood by referring to the accompanying drawing in which.

Figure 1:
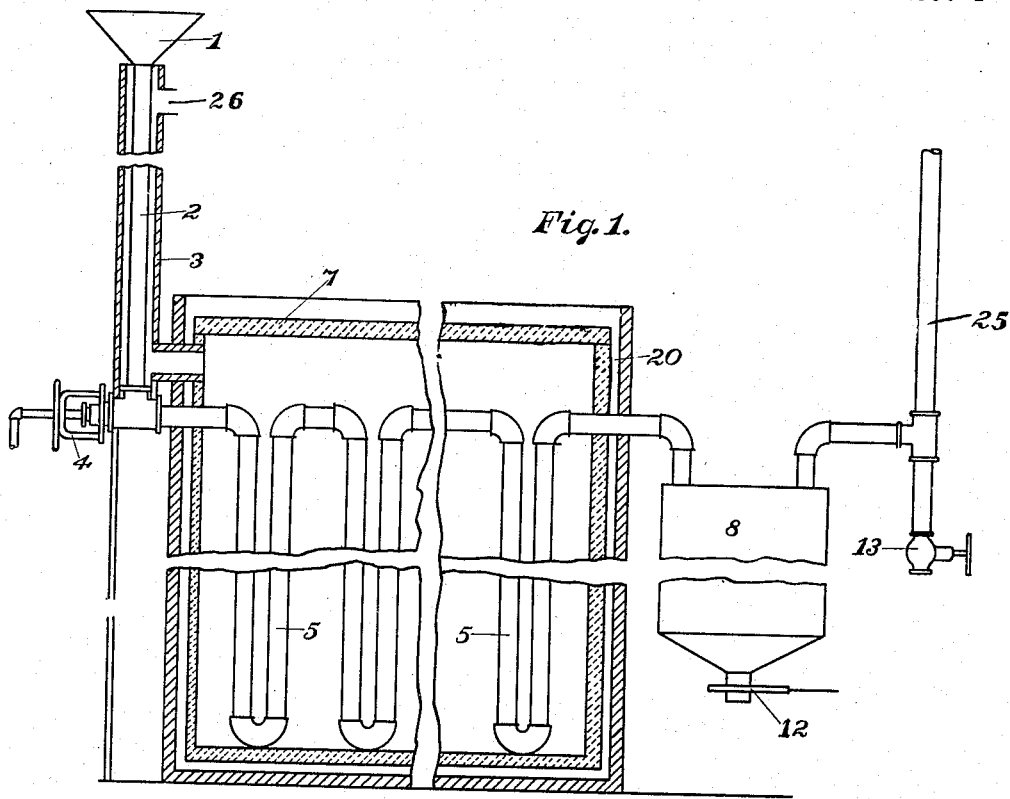
Figure 1 represents a vertical, longitudinal, section of one form of furnace with parts in elevation.

In the form of furnace shown in Fig. 1 the finely divided solid material is fed in through hopper (1) and tube (2) which is surrounded by the exhaust pipe (3) carrying off hot combustion gases from the furnace proper. The solid material heated by the combustion gases drops in front of a jet of the reacting gaseous fluid supplied to an injector designated as a whole by the numeral (4). This injector forces the solid through the convolutions of the piping system (5) (for convenience this piping system (5) and the modified forms shown in the other figures will be hereafter referred to as a "coil"). This coil is located within a suitable chamber (7) heated in any suitable manner and from the coil passes out into a settling chamber (8) where the gases and solids separate and are separately collected.

Figure 2:
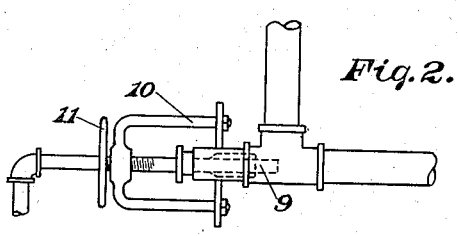
Fig. 2 shows a detail on a large scale of the injector for the fluid and solid.

The injector shown in Fig. 1 is more clearly illustrated on a somewhat larger scale in Fig. 2. Referring to Fig. 2 it will be noted that the injector consists of a nozzle or jet (9) projecting into one opening of a T in line with the end of coil (5) and so positioned that material in the pipe (2) will reach the mouth of the jet. This jet is also arranged so that it may be advanced or withdrawn within the T by means of the yoke (10) and handwheel (11). A suitable packing is also provided. By means of this advance or withdrawal of the jet (9) in connection with the regulation of the supply of gas or vapor to the jet, the relative amounts of solid and gas or vapor forced through the coil (5) by the injector may be changed as desired. When no gas or vapor passes through this injector no solid moves into coil (5). The settling chamber (8) is provided with a suitable gate valve (12) for the removal of solids, and the gases pass off through the pipe (25), which latter is provided with a draw-off valve (13) for removal of any material which may be carried over from (8) and collect in (25).

Figures 3, 4:
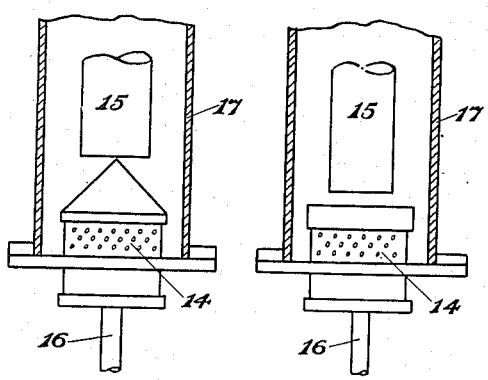
Figs. 3 and 4 show modified forms of injectors.

The regulation of the distributing box (14) in respect to the pipe (15) is important. In the case of Fig. 3 the distributing box (14) has a conical top. By the use of the cone shape the material from (15) distributes itself by rolling or sliding down the surface of the cone and into contact with the gaseous fluid passing from the perforations of the distributing box (14). The amount of material which can flow from pipe (15) and be available at any particular moment for lifting by the gaseous fluid passing from (14) is dependent upon the distance of (15) away from the conical surface of (14). This distance can be so regulated that a relatively small amount of material falls into the bottom of tube (17) or so that a much larger amount falls into (17) in accordance with the lifting powers of the gaseous fluid flowing from the perforation to (14). In this form some solid material is constantly in the bottom of tube (17) regardless as to whether or not gaseous fluid is passing from distributing box (14).

In Fig. 4 another form of distributing box is illustrated in which distributing box (14) has a flat top. In this case regulation of the inner tube (15) to greater or shorter distances from the flat top of the distributing box allows more or less material to be lodged upon the flat surface (14). The velocity of the gas ensuing from distributing box (14) is such as to pick or suck up the finely divided or granular material from the upper surface of the plate. The greater the distance of (15) from (14) the larger the amount of material lifted per unit of velocity of any given gaseous fluid. Hence, adjustment can be made to proportion the relative quantities of gas and solid held in suspension by said gas. In this form of indicator there is no excess of material held in tube (17) proper, the only amount being that resting in repose on the upper surface of the distributing box.

In these forms of injectors the solids are supplied through pipe (15) and are subjected to the action of gas or gaseous fluid supplied through pipe (16) and issuing through the perforations in the side of the distributing box. The gas supplied through (16) may be combustion gases in which case the gases from the exit flues (24 or 26) are conveyed through a pipe to a fan or compressor (not shown) and then forced into the pipe (16). Or such gases are drawn through the furnace by suction applied at the exit (25). The gas issuing from the perforations in the distributing box will rush up through the pipe (17) and carry with it the solid material passing then into and through the coil (5). The material may be finely divided or granular.

Figure 5:
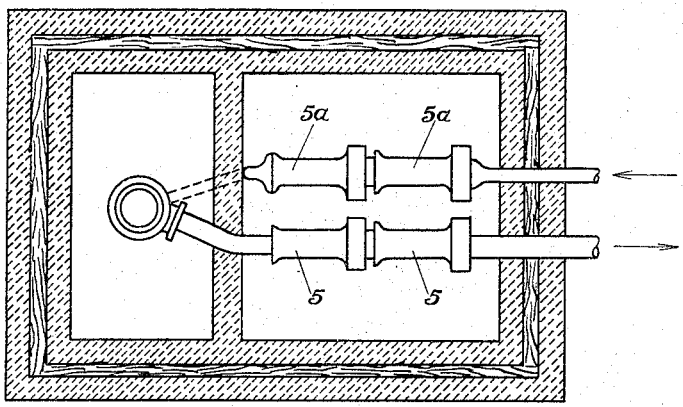
Figs. 5, 6 and 7 show respectively a horizontal section, a vertical, longitudinal section and a vertical cross-section of a modified form of furnace using the types of injectors shown in Figs. 3 and 4.
Figure 6:
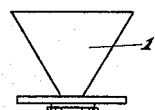
Figure 7:
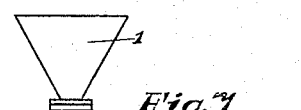
Figure 7:
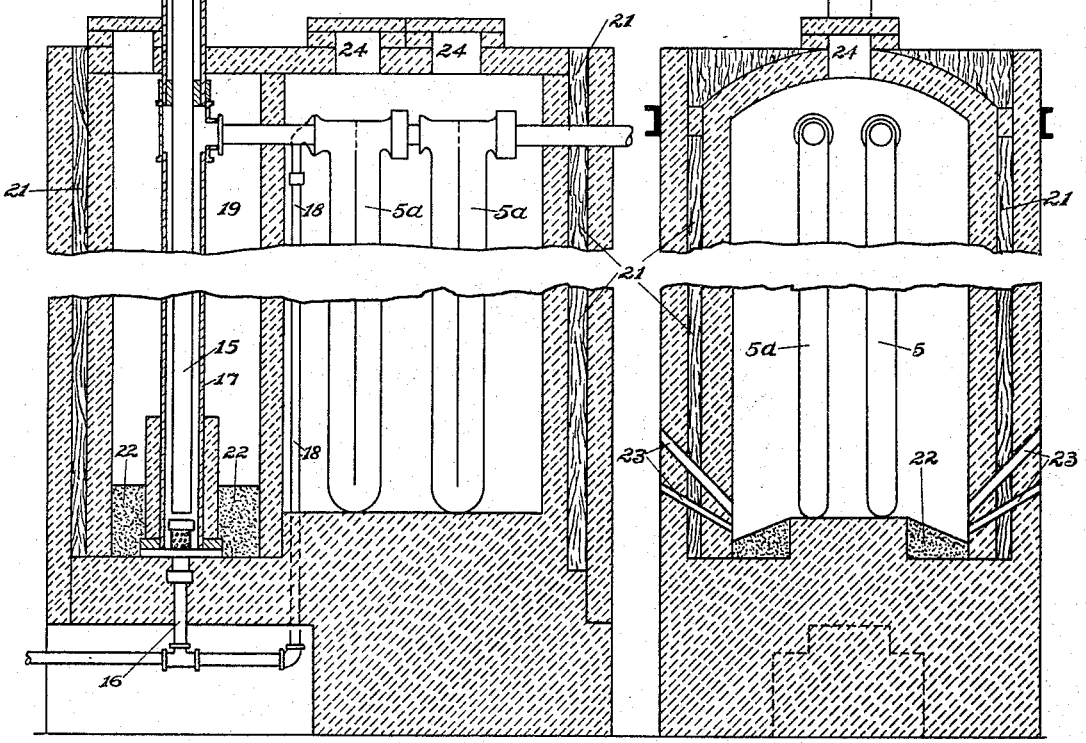

In the form of furnace shown in Figs. 5, 6 and 7 the vertical acting injector is used and this is supplied with gaseous fluid which has been previously superheated. The furnace is constructed with two coils (5) and (5ª) through the former of which the mixture of solid and fluid passes and through the latter the incoming gaseous fluid to be superheated. When combustion gases are used as the reactive gas, such gases are introduced into the entrance of (5ª). The positioning of coils (5) and (5ª) is clearly shown in Figs. 5 and 7. Fig. 6 shows the supply pipe (18) from the exit end of the coil (5ª) passing down through the furnace and connecting with the pipe (16) to the injector.

In this form of furnace we have two separate heating chambers, the one containing preliminary heating tube (17) and the injector, and the other containing the tubes (5) and (5ª). Separate heating systems are used to provide the heat for the two chambers. Chamber (19) is ordinarily heated much higher than the other chamber on account of the fact that the material introduced through tube (17) must be raised to temperature for reaction, and it is desired to accomplish this elevation of temperature as rapidly as possible, whereas in the reaction chamber of the furnace ordinarily the temperature is essentially that required for maintaining the temperature for reaction. By providing the two chamber zones in the furnace the heating up temperature and the maintaining temperature can be regulated independently.

The furnace shown in the drawings are constructed of fire-brick or other suitable material and are preferably covered with a wall of ordinary brick so built as to leave a space (20) for heat insulating material (21) between the two walls. This is clearly shown in Figs. 1, 5, 6 and 7. In the first figure the space (20) is shown unfilled for the sake of clearness while in the latter three views the insulating material (21) is indicated.

While in Fig. 1 the furnace is shown as including a single heating chamber, the form shown in the last figures includes at least two heating chambers. In the latter form there is also indicated one method of heating the furnace. The heating is carried out by surface combustion produced in the refractory granular material (22) supplied with the required amounts of fuel and air through suitable tubes (23). Suitable peepholes may also be provided in order that the operation may be observed.

Suction may be applied at the end of the exit (12) and the gases drawn by the reduced pressure thus created rather than introducing them under direct pressure with the injector. When it is desired to introduce combustion gases from the furnace, all that is necessary is to provide the necessary piping to conduct the same from exit (24) to intake of (5a). When suction is used such gases will be pulled through the system. When suction is not used the combustion gases are passed through a fan or compressor to give sufficient compression to provide the proper velocity to the gas at the point of injection of solids to the coil as indicated at (9) Fig. 2.

The heating chambers are also furnished with regulating flues (24) which are capped with ceramic slabs, which can be set in any desirable position. The slabs act as dampers on the escaping or waste combustion gases. The flues can also be used for entrance ports or manholes as will be obvious to those skilled in the art.

An example of a process which is very readily carried out in this form of furnace is the activation of coconut charcoal.

In such a process the charcoal in granular condition is heated to 875° C., injected into and passed through either form of furnace while the reaction coils are maintained at this temperature.

A further example is the reduction of metal oxides such as nickel-oxide by hydrogen.

Other uses of the apparatus and processes to which it is especially adapted will readily occur to those skilled in the several arts.

It should be noted that one of the essential features of this form of furnace is the provision of an extended reaction chamber in the form of a coil or analogous construction comprising a plurality of abrupt turns such as is clearly shown in Figs. 1 and 6. By the construction of the coil in this form the mixed current of solids and gaseous fluid will be thoroughly agitated or mixed, and the solid will not be allowed to settle out. A further feature is the means by which the solid particles are suspended in the gaseous fluid and carried along therewith in such fashion that each particle is in contact on all sides with the gaseous fluid and a maximum rapidity of reaction therewith secured.

The construction may be of any proper material such as iron, nichrome or other special metallic alloys or ceramic materials, the specific material being chosen to meet the requirements of temperature and specific character of solids and gases.

It is, of course, obvious that where it is necessary to shorten the length of time of reaction, use may be made of a shorter coil, and to lengthen the time a longer coil can be used. Each application requires its specific time to obtain the best results. Also each application has its specific temperature requirements. The time of reaction may also be regulated by the speed with which the mixture is injected into and passed through the reaction chamber.

The size of the tubes, injectors, settling chamber, etc. is regulated in accordance with the work to be performed and capacity desired.

This invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims:

I claim:

1. A furnace comprising a heating chamber, a conduit within said heating chamber having connected thereto a feed hopper and means for introducing gaseous, reactive fluid under pressure, another heating chamber, a reaction chamber within the latter heating chamber, communicating means between said conduit and said reaction chamber, and a separator for solids and gases communicating with said reaction chamber and adapted to receive the reaction products therefrom.

2. A furnace comprising a heating chamber, a conduit within said heating chamber having connected thereto means for introducing gaseous, reactive fluid under pressure, and means for delivering finely divided solid material into the path of said gaseous, reactive fluid, another heating chamber, a reaction chamber within the latter heating chamber, communicating means between said conduit and said reaction chamber, and a separator for solids and gases communicating with said reaction chamber and adapted to receive the reaction products therefrom.

3. A furnace comprising a heating chamber, a substantially vertical conduit within said heating chamber having at its lower portion an injector for introducing gaseous, reactive fluid under pressure, means for delivering finely divided solid material into the path of said gaseous, reactive fluid, another heating chamber, a reaction chamber within the latter heating chamber, communicating means between said conduit and said reaction chamber, and a separator for solids and gases communicating with said reaction chamber and adapted to receive the reaction products therefrom.

4. A furnace comprising a heating chamber, a conduit within said heating chamber having connected thereto a feed hopper and means for introducing gaseous, reactive fluid under pressure, another heating chamber, a reaction chamber within the latter heating chamber and comprising a long, tortuous passage, communicating means between said conduit and said reaction chamber, and a separator for effecting separation of solids from gases communicating with said reaction chamber and adapted to receive the reaction products therefrom.

5. A furnace comprising a heating chamber, a conduit within said heating chamber having connected thereto means for introducing gaseous, reactive fluid under pressure and means for delivering finely divided solid material into the path of said gaseous, reactive fluid, another heating chamber, an extended reaction chamber of relatively small cross-section within the latter heating chamber, communicating means between said conduit and said reaction chamber, and a separator for effecting separation of solids from gases communicating with said reaction chamber and adapted to receive the reaction products therefrom.

6. A furnace comprising heating chamber, a substantially vertical conduit within said heating chamber having at its lower portion an injector for introducing gaseous, reactive fluid under pressure, means for delivering finely divided solid material into the path of said gaseous, reactive fluid, another heating chamber, a reaction chamber within the latter heating chamber and comprising a long, tortuous passage, communicating means between said conduit and said reaction chamber, and a separator for effecting separation of solids from gases communicating with said reaction chamber and adapted to receive the reaction products therefrom.

7. In combination, a reaction chamber communicating at one end with a mixing chamber and at the other end with a separator for removing solids entrained in gaseous mixtures, heating means surrounding said reaction and mixing chambers, means extending into said mixing chamber for supplying gaseous, reactive fluid under pressure and means for delivering finely divided solid material to said mixing chamber.

8. In combination, a reaction chamber comprising a long, tortuous passage communicating at one end with a mixing chamber and at the other end with a separator for removing solids entrained in gaseous mixtures, heating means surrounding said reaction and mixing chambers, an injector extending into said mixing chamber for supplying gaseous, reactive fluid under pressure and means for delivering finely divided solid material to said mixing chamber in the path of said gaseous, reactive fluid.

9. In combination, a reaction chamber inclosed within a heating chamber communicating at one end with a mixing chamber disposed within another heating chamber and communicating at the other end with a separator for removing solids entrained in gaseous mixtures, means extending into said mixing chamber for supplying gaseous, reactive fluid under pressure and means for delivering finely divided solid material to said mixing chamber.

10. In combination, a reaction chamber comprising a long, tortuous passage inclosed within a heating chamber communicating at one end with a mixing chamber disposed within another heating chamber and communicating at the other end with a separator for removing solids entrained in gaseous mixtures, an injector extending into said mixing chamber for supplying gaseous, reactive fluid under pressure and means for delivering finely divided solid material to said mixing chamber in the path of said gaseous, reactive fluid.

In testimony whereof, I affix my signature.

OSCAR L. BARNEBEY.